Figure 1:
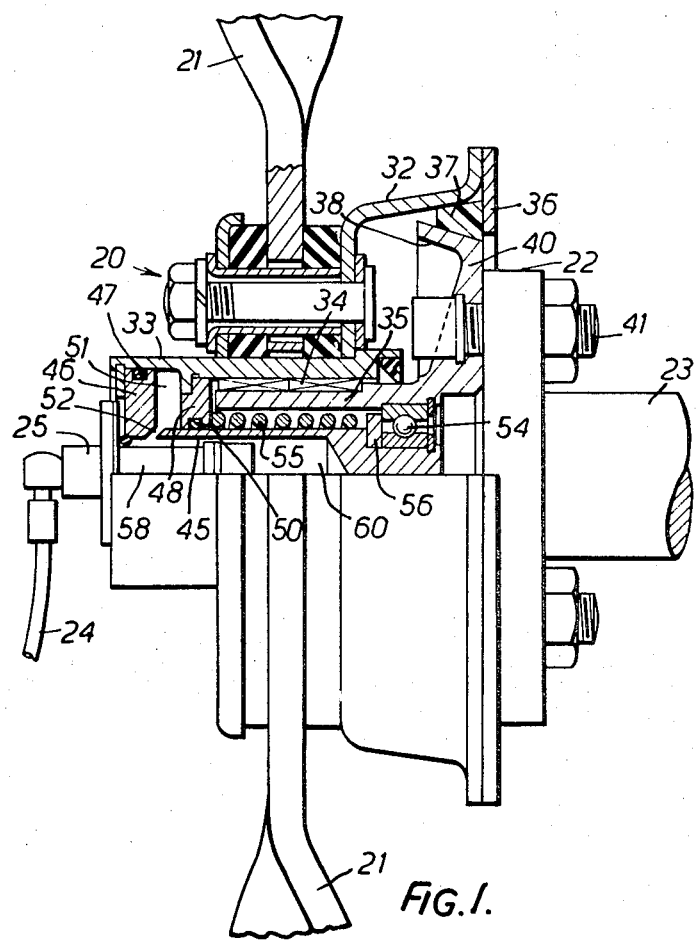

United States Patent
Elmer

[15] 3,684,397
[45] Aug. 15, 1972

[54] ROTARY TRANSMISSION DEVICE

[72] Inventor: Arthur Ernest Henry Elmer, Merry Lodge, Court Orchard, Painswick, England

[22] Filed: June 23, 1970

[21] Appl. No.: 49,005

[30] Foreign Application Priority Data

June 25, 1969 Great Britain..........32,008/69

[52] U.S. Cl. ................416/39, 416/169, 123/41.12, 192/82 T, 192/91 A, 192/70.15
[51] Int. Cl. ............................................F04d 29/32
[58] Field of Search ..416/169, 39; 123/41.12, 70.15; 192/82 TD, 91 A

[56] References Cited

UNITED STATES PATENTS

| | | | |
|---|---|---|---|
| 3,467,071 | 9/1969 | Elmer | 416/39 |
| 1,482,498 | 2/1924 | Wills | 416/169 |
| 3,077,298 | 2/1963 | Fowler | 416/39 |
| 3,014,568 | 12/1961 | Péras | 416/169 |
| 3,103,308 | 9/1963 | Wolfram | 416/39 |

*Primary Examiner*—Everette A. Powell, Jr.
*Assistant Examiner*—Clemens Schimlkowski
*Attorney*—Young & Thompson

[57] ABSTRACT

A rotary transmission for cooling fan drives including a friction clutch and a pneumatically operated ram controlling the clutch against spring loading, the compressed air supply being controlled in turn by a thermostat valve. To ensure that the fan will be driven if the air supply or valve fails the clutch is engaged by the spring and disengaged by the ram. The substantial spring loading is absorbed between a pair of abutments which rotate together and a closed axial force-transmitting loop prevents axial forces appearing on the external drive members. The device may be built into the hub of a self contained cooling fan, or may be in the form of a shaft drive unit with a stationary casing.

6 Claims, 3 Drawing Figures

PATENTED AUG 15 1972

3,684,397

SHEET 1 OF 2

INVENTOR
ARTHUR ERNEST HENRY ELMER
BY
Young & Thompson
ATTORNEYS

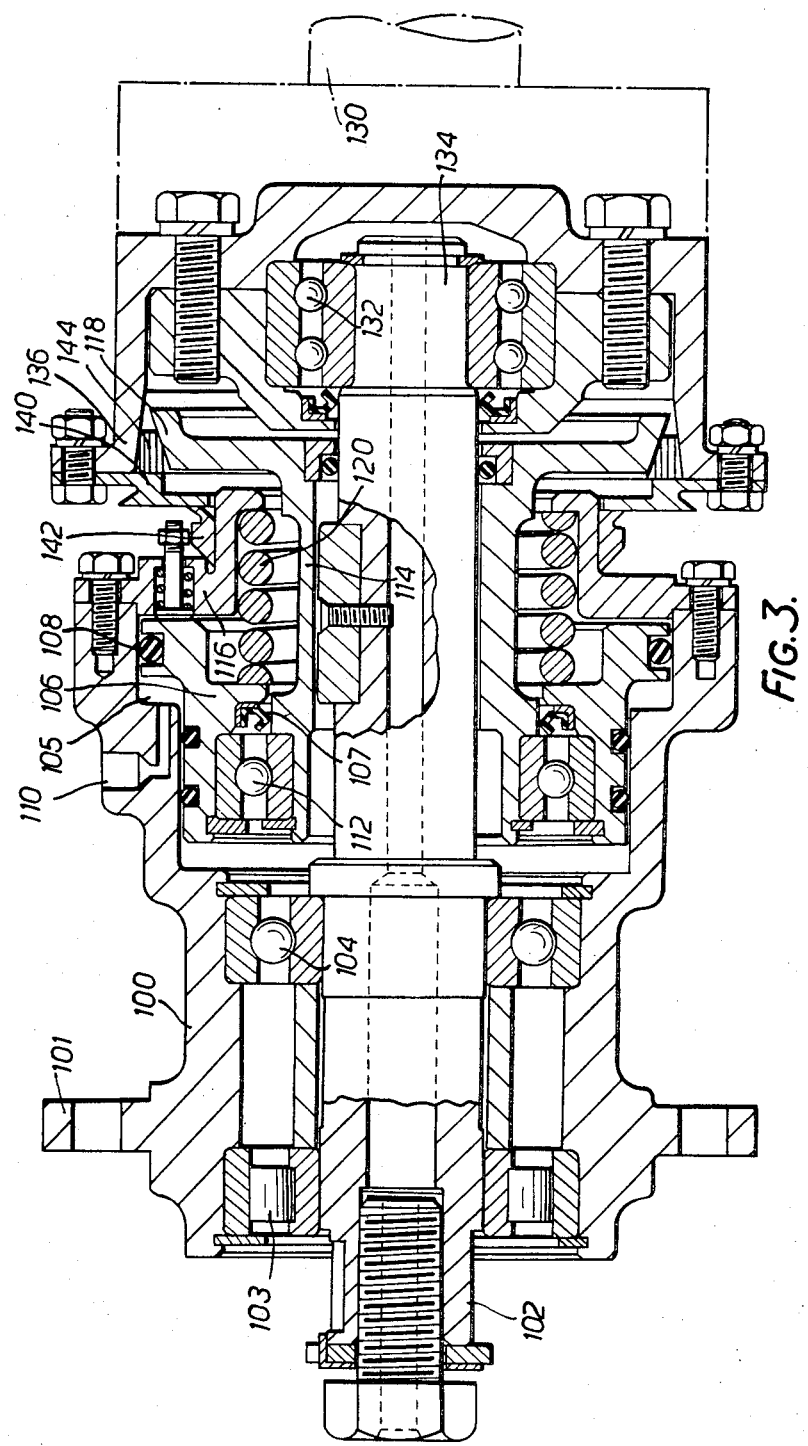

ROTARY TRANSMISSION DEVICE

This invention relates to rotary transmission devices including a clutch arranged to be actuated by a fluid-operated ram. The invention is particularly applicable to rotary fans incorporating ram-operated clutches, but can also be applied to shaft drives.

It is known to incorporate in the cooling fan of an internal combustion engine a clutch device to disengage the drive to the fan when cooling requirements are reduced, for example when starting, in cold weather, or when the temperature of the engine coolant falls below a predetermined value. Most engine-cooling fans are designed to provide adequate cooling under the worst possible conditions and full cooling is only required for a small part of the total running time. Many types of cooling fan with clutch drives have been proposed but most existing designs suffer from disadvantages or limitations and it is one object of the present invention to provide an improved rotary fan drive or shaft drive, having a fluid-operated clutch arranged to be capable of engagement even if the control system should fail, and in such a manner that excessive loads are not exerted on parts such as bearings which may have to run at high speeds.

From one aspect the invention consists broadly in a rotary transmission including a clutch arranged to transmit torque to an output element from an input drive member, a fluid-operated ram for controlling the actuation of the clutch and resilient means tending to urge the clutch into its engaged position, the resilient means acting between two abutments which are relatively movable in an axial direction but are arranged to rotate together.

Conveniently the two parts of the clutch are interconnected through an axial thrust bearing and the arrangement is such that there is no axial reaction on the bearing when pressure fluid is admitted to the ram and the clutch is disengaged. Preferably axial reaction thrust is applied to the bearing only when the bearing is stationary (i.e. there is no relative rotation).

Some of the advantages of the invention can be attributed to the fact that in preferred constructions the two parts of the ram are both arranged to rotate with the fan hub, so that no relative rotation occurs between these two parts of the ram.

A rotary fan according to the invention will usually include a bearing by which the hub assembly is mounted from another part of the fan, and the arrangement is preferably such that the operating compressed air admitted to the ram is prevented from reaching the bearing, which might cause lubricant to escape.

As stated above the invention is also applicable to shaft drives, and from another aspect the invention consists in a shaft drive including a friction clutch, pressure fluid operated means for disengaging the clutch, and spring means for engaging the clutch, the arrangement being such that no external axial reaction forces result from the engagement or disengagement of the clutch.

Figure 2:
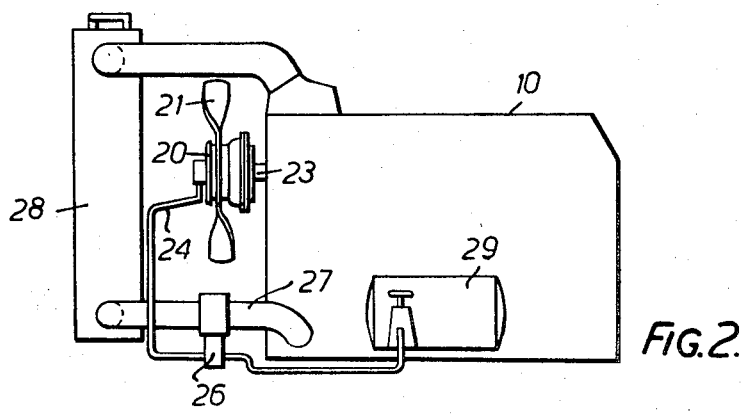

The invention may be performed in various ways and two embodiments will now be described by way of example with reference to the accompanying drawings, in which:

FIG. 1 is a simplified diagrammatic sectional elevation through a rotary fan drive hub according to the invention, FIG. 2 is a diagrammatic illustration showing the fan installed as part of the cooling system for a water cooled internal combustion engine, and FIG. 3 is a sectional elevation through a shaft drive according to the invention.

In the first example illustrated in FIGS. 1 and 2 the invention is applied to a cooling fan for an internal combustion engine 10. The apparatus comprises a fan hub 20 with blades 21 mounted thereon, designed to be substituted as a complete unit for an existing fan whether it be of the shaft-driven or pulley-driven variety. The unit can be simply bolted on to the flange 22 at the front end of the driving shaft 23 without any other means of support. The pneumatic ram of the hub unit, which will be described in detail below, is operated by means of a flexible compressed air line 24 attached to a rotary coupling 25 at the front end of the hub unit, this line leading to a control valve 26. The valve is subject to and operated automatically by the water temperature in the lower hose return connection 27 between the cylinder block of the engine 10 and the radiator 28, and the valve is also connected to a source of compressed air on the vehicle (indicated diagrammatically at 29) and so arranged that when the coolant temperature is below a predetermined value compressed air is admitted continuously to the ram of the fan, so as to disengage a clutch within the fan hub. If the valve or the air supply should fail the clutch will be engaged automatically. When the coolant temperature rises to the predetermined value, the valve 26 connects the pressure line 24 to relief so that the ram can exhaust, and the clutch is then engaged by spring force.

The fan hub unit as shown in FIG. 1 comprises an outer casing including a dome-shaped housing 32 for the clutch the housing being rigidly attached to a cylindrical sleeve 33 on which the fan blades 21 are mounted, by means of resilient cushioning rings. This sleeve 33 also constitutes part of the pneumatic ram and acts as the outer race for a bearing 34 by which the casing unit is supported on an inner hollow spigot member 35. At the rear end of the dome-shaped housing 32 (which also acts as the driven clutch member) there is secured a flange 36 which acts to locate a friction ring 37 of trapesoidal section within the housing. The friction ring cooperates with a flange 38 on a driving clutch member 40 which has a part-conical external surface of increasing diameter towards the front end of the unit. This driving clutch member 40 has apertures to receive bolts 41 by which it is bolted to flange 22 on the front end of the drive shaft 23. The arrangement is such that when the dome-shaped casing member 32 moves forwardly in relation to the driving clutch member 40 the friction ring 37 is gripped against the tapered clutch surface.

The driving clutch member 40 is formed integral with the hollow tubular spigot 35 projecting forwards within the hollow sleeve 33 and the bearing 34, which consists of a pair of needle roller bearings, is positioned between these two members 33, 34 so that the hub casing and fan blades are entirely supported on the projecting spigot 35.

The hollow sleeve 33 of the casing acts as the outer wall of the pneumatic ram, the inner wall being provided by a second inner tubular sleeve member 45 of smaller diameter than the hollow spigot 35. This second tubular member 45 at its forward end is formed integral with an external annular flange 46 having a sealing ring 47 around its circumference, engaging and capable of sliding axially relative to the internal surface of the outer sleeve 33. The outer sleeve 33 is also rigidly connected to an inwardly projecting annular flange 48 having a sealing ring 50 around its internal periphery to engage the inner tubular member 45. The annular space 51 between these two flanges 46,48 constitutes the ram chamber, and one or more drillings 52 are provided through the inner sleeve 45 to allow compressed air to be admitted and exhausted therefrom.

The inner sleeve 45 extends rearwardly (i.e. to the right in FIG. 1) within the hollow spigot 35 of the clutch input member and at its rear end there is provided a ball-type axial thrust bearing 54 providing axial location between these two parts. A helical compression spring 55 is positioned between this inner tubular member 45 and the hollow spigot 35 and abuts at one end against the flange 48 fixed to the outer sleeve 33 and at the other end against a shoulder 56 secured to the inner sleeve. The spring 55 acts in a direction to urge the outer sleeve 33 and the dome-shaped outer clutch housing 32 forwardly, i.e. to the left in FIG. 1, in a direction to engage the clutch.

The compressed air line 24 is connected to a rotary fluid-sealing device or coupling 58 which is inserted into the forward end of a central socket within the inner sleeve 45. This coupling is positioned on the rotary axis and is of relatively small diameter thus minimizing rotary speeds, rubbing and wear.

Compressed air admitted via the flexible tube 24 and this rotary coupling 58 enters the cavity 60 within the inner sleeve 45 and passes through the drilling 52 into the annular ram chamber 51. The air pressure in the chamber exerts an axial separating thrust between the two annular flanges 46,48. Since the forward flange 46 is effectively fixed axially, through the inner tubular member 45 and the axial thrust bearing 54, the reaction thrust acting rearwardly on the other flange 48 tends to urge the outer hub casing 32 rearwardly, so as to disengage the clutch. In doing so the helical spring 55 is compressed, but the reaction thrust on this spring does not react on or through the thrust bearing 54. It will be noted that the compressed air admitted to the annular ram chamber 51 is sealed off by the O-ring 50 from the needle roller bearings 34 and the thrust bearing 54, and any grease packed in these bearings is not intimately contacted by the air. A lip seal 61 is provided between the outer sleeve 33 and the rear end of the hollow spigot 35 to prevent grease escaping at this point towards the clutch surfaces.

When the temperature of the coolant water in the lower hose 27 rises to a predetermined value, the automatic thermal control valve 26 closes, and connects the flexible pressure line 24 to exhaust, allowing air to escape from the ram chamber 51 under the influence of the spring 55 which also acts to engage the clutch 37,38. The fan blades 21 are therefore driven at the speed of the driving shaft 23 to provide full cooling. The aerodynamic axial reaction thrust of the air on the fan blades acts forwardly tending to hold the clutch engaged. In these conditions the axial thrust of the spring 55 does react through the axial thrust bearing 54 but it will be noted that in these conditions no relative rotation occurs between the two parts of the bearing since the clutch is engaged and the hub 33 is driven at the same speed as the clutch driving member 40. The whole unit thus rotates bodily at the same speed, except for the small diameter fluid coupling 58, at the front end.

In the second embodiment illustrated in FIG. 3 the invention is applied to a shaft drive including a pneumatically operated friction clutch. The shaft drive may be used for various purposes but in this particular example it is intended to form an auxiliary drive to an external cooling fan from an internal combustion engine, the clutch again being controlled automatically be a thermo-actuated valve (not shown) sensitive to the temperature of the engine coolant, so as to engage the drive when the temperature falls below a predetermined value.

The clutch comprises a hollow non-rotary casing 100 having a mounting flange 101, and located on an input shaft 102 by means of a pair of bearings 103,104, the bearing 104 being a ball-type thrust bearing. The casing 100 defines an annular pressure chamber 105 surrounding the input shaft. Within this chamber is mounted a non-rotary annular sliding piston 106 having internal and external seals 107,108 to prevent escape of air, and an air supply line 110 leads through the wall of the non-rotary casing and communicates with the pressure chamber 105. The piston 106 is connected to the outer race of a second ball-type thrust bearing 112, of which the inner race is connected to a sliding sleeve 114 keyed or splined to the input shaft 102 to rotate therewith. This sleeve 114 projects through an aperture in an end plate 116 closing the end of the casing 100 remote from the input shaft 102, and the projecting end of the sleeve is connected to an input friction clutch member 118, with a part-conical tapered surface at its periphery. A compression spring 120 acts between the end plate 116 and the piston 106, and acts via the bearing 112 to urge the sleeve 114 and the input clutch member 118 in a direction towards the input shaft, i.e. to the left in FIG. 3, to engage the clutch.

The output shaft (indicated diagrammatically in chain lines at 130) is connected to the assembly and supported by a double ball-type thrust bearing 132 carried on a spigot 134 at the end of the input shaft 102 which protrudes beyond the first clutch member 118. The output shaft 130 is rigidly connected to an output friction clutch member 136 which surrounds the input clutch member 118 and is formed with a cooperating frusto-conical internal surface. This second clutch member 136 is also rigidly attached to an annular radial metal plate 140 which is spaced from but encloses the first clutch member 118 and is provided with a dust-excluding seal 142 engaging the cover plate 116 on the clutch casing. Between the two clutch members 118,136, there is positioned an annular friction clutch lining 144 which is trapezoidal in cross section and is split radially, the natural shape of this lining being such that it is slightly precompressed when inserted within the second clutch member. The lining is not directly attached to either of these members. The dimensions of the clutch lining 144, the clearance between the two clutch members 118,136, and the axial spacing of the radial metal flange 140, are such that when the clutch is engaged by movement of the first clutch member 118 to the left, the clutch lining 144 is pinched between the two conical surfaces of the clutch members and tends to move towards and into contact with the radial metal plate 145. It is then in contact with three metal surfaces and is capable of rubbing against all three surfaces. Heat can therefore be generated by friction at all three surfaces and heat dissipation is correspondingly improved.

In operation the spring 120 normally tends to urge the sleeve 114 and the first clutch member 118, towards the left in a direction to engage the clutch. The axial spring thrust exerted on the first clutch member 118 is transferred through the clutch lining 144 to the second clutch member 136 and is then transmitted through the double ball-type thrust bearing 132 back to the input shaft 102. From the input shaft 102 the reaction thrust is transmitted through the first ball type thrust bearing 104 to the casing 100 of the clutch, this casing being rigidly secured to the end plate 116 which provides the opposite, fixed, abutment for the spring 120. It will be seen therefore that the arrangement provides a closed axial thrust circuit via the two clutch members between the two working parts of the piston and cylinder assembly. Operation of the clutch therefore imposes no external axial thrust on either the input or output shafts 102, 130 or the casing. The casing 100 of the clutch is prevented from rotating by a link or other non-rotary connection attached to the flange 101.

When the temperature of the cooling water of the engine reaches or exceeds a specified value the automatic thermal servo mechanism (not shown) opens a valve similar to valve 26 in FIG. 2) to exhaust the compressed air from the pressure chamber 105, so allowing the clutch to be engaged by the spring 120.

When the temperature of the engine cooling water is below the predetermined value the valve is arranged to admit air under pressure continuously to the port 110. The fluid pressure within the annular pressure chamber 105 forces the annular piston 106 towards the right-hand end of the clutch casing and this axial thrust overcomes the spring 120 and is transmitted through the second ball-type thrust bearing 112 to the sleeve 114 surrounding the input shaft. This thrust moves the sleeve 114 together with the first clutch member 118 to the right, thus disengaging the clutch in the manner described above. As in the first example, if the valve or the compressed air supply should fail the clutch will be engaged by the spring 120, so that the engine will not overheat.

I claim:

1. A rotary fan assembly including at one end an input drive member provided with means for connection to a rotary driving element, a hub provided with means for attachment of fan blades thereto, said hub being capable of relative rotation and relative axial movement with respect to said input drive member, a clutch including two clutch members attached respectively to said input drive member and to said hub whereby axial movement of said hub causes engagement and disengagement of said clutch, said fan blades being so arranged that the axial reaction forces therefrom act in a direction to engage said clutch, a spring means arranged to exert an axial force between said hub and said input drive member in a direction to engage said clutch, said spring means acting on one of said members through a rotary thrust bearing, which in one operative condition of said clutch is subject to relative rotation, and in the other operative condition of said clutch is not subject to relative rotation, a fluid operated ram including a ram piston and a ram cylinder supported by said hub, and arranged to exert an axial force between said hub and said input drive member in a direction opposed to said spring means, to disengage said clutch, and means for admitting operating fluid to said ram via a fluid duct positioned at the axial end of said hub opposed to said input drive member, said assembly also including axial abutment means at opposite ends of said spring means, one of said abutment means acting against a part of said thrust bearing whereby both abutment means are capable of conjoint rotary movement, and means acting in one operative condition of said clutch to load said thrust bearing by the stress in said spring means, and in another operative condition of said clutch to relieve said thrust bearing of the stress in said spring means.

2. A rotary fan assembly according to claim 1, in which said hub, clutch, input drive member, thrust bearing, spring means, abutment means, and ram, constitute a closed axial force-transmitting loop, whereby axial reaction forces from said ram and spring means are confined within said fan assembly.

3. A rotary fan assembly according to claim 1, in which at least one of said piston and cylinder elements of said ram is capable of rotary movement relative to said input drive member or said hub respectively, whereby relative rotation between said piston and cylinder elements is avoided.

4. A rotary fan assembly according to claim 1 in which said fluid duct for admitting fluid to said ram comprises a non-rotating compressed air supply line positioned centrally on the rotary axis of said assembly.

5. A rotary fan assembly according to claim 1, including an axially movable bearing by which said hub is mounted on a part connected to said input drive member, and including sealing means whereby the ram operating fluid admitted to the ram is prevented from reaching said bearing.

6. A rotary fan assembly according to claim 5, including a sleeve within said hub, connected to one element of said ram and to said thrust bearing, and a hollow spigot connected to said clutch input drive member, and surrounding said sleeve with a clearance, said axially movable bearing surrounding said spigot, and said spring means and thrust bearing being positioned at least partly between said hollow spigot and said sleeve.

* * * * *